(No Model.)
J. T. HAMILTON.
NECK YOKE CLIP.
No. 455,829. Patented July 14, 1891.
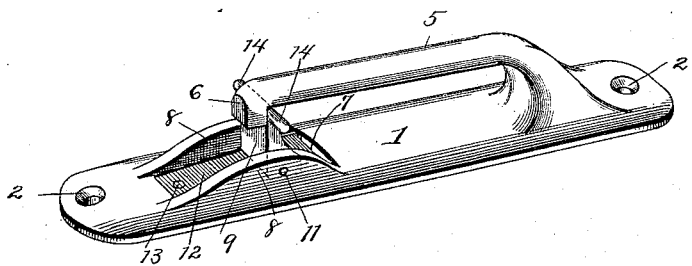
Fig. 1.
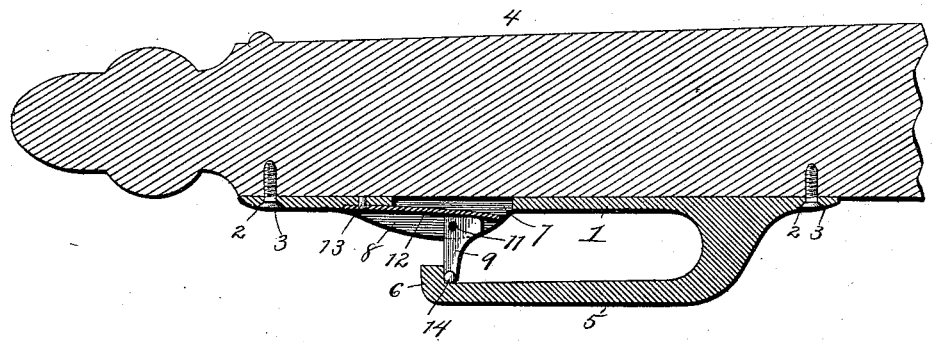
Fig. 2.
Fig. 3.
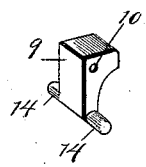
Fig. 4.
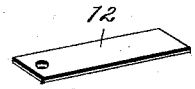
Witnesses:
G. Y. Thorpe.
Jno. L. Coudon.
Inventor:
John T. Hamilton.
By Higdon & Higdon,
Attorneys.

UNITED STATES PATENT OFFICE.

JOHN T. HAMILTON, OF CRAB ORCHARD, MISSOURI.

NECK-YOKE CLIP.

SPECIFICATION forming part of Letters Patent No. 455,829, dated July 14, 1891.

Application filed April 6, 1891. Serial No. 387,827. (No model.)

*To all whom it may concern:*

Be it known that I, JOHN T. HAMILTON, of Crab Orchard, Ray county, Missouri, have invented certain new and useful Improvements in Yoke-Bar Clips, of which the following is a full, clear, and exact description, reference being had to the accompanying drawings, forming a part hereof.

My invention relates to clips for neck-yoke-strap holders for two-horse vehicles; and the object of my invention is to produce a simple, durable, and inexpensive form of clip or holder by means of which the yoke-straps can be easily and quickly connected to and disconnected from the yoke-bar, and which will at the same time prevent all possibility of the yoke-straps becoming accidentally detached from the yoke-bar.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1 is a detached perspective view of my improved clip, the said clip being in inverted position. Fig. 2 is a central longitudinal section of the same and one end of a yoke-bar to which the clip is attached, the said parts being on a full-size scale and the clip being in proper operative position. Fig. 3 is a detached perspective view of the catch or dog for retaining the yoke-strap under the clip-arm. Fig. 4 is a detached perspective view of the spring which holds the catch or dog in position.

In the said drawings, 1 designates the base of the clip, said base being of elongated form and having at each end holes or eyes 2, through which screws 3 or equivalent devices are passed to secure the clip to a yoke-bar 4, as hereinafter more fully described.

5 designates an L-shaped bar or arm, which is formed integrally with the base 1, and one end of which unites with said base near one end of the latter. This arm or bar 5 extends parallel with and longitudinally beneath the base 1, and its outer end is turned upwardly at right angles to form a retaining-lug 6, for a purpose to be presently explained. Immediately above the outer end of the arm 5 the base 1 is formed with an elongated opening or slot 7, which extends longitudinally of the base, and the under side of said base is formed at the two lower sides or margins of this slot with two enlargements or lugs 8. Between these two lugs 8 is located a catch or dog 9, which is made longer at its upper end and gradually diminishes in thickness to its lower end, as shown in Fig. 3. Through the thicker or larger part of this dog or catch is formed an opening or eye 10, through which passes a pin 11, the said pin passing also through the lugs or ears 8, above referred to, and constituting a pivot upon which the dog 9 can be turned.

12 designates a flat spring, the outer end of which is secured to the base 1, adjacent to the outer end of arm 5, by a rivet 13 or an equivalent device, and which extends over and works in the slot 7 of the base. The upper surface of the dog or catch 9 is flat, the spring 12 resting upon this flat end, and the pressure of this spring holds the outer end of the dog against the lug 6 of the arm 5. The outer or lower end of this dog is formed with two oppositely-extending lugs 14, to which the user's finger or thumb is applied when attaching or detaching the yoke-strap.

The clip constructed as above described is attached to the end of the yoke-bar at a point somewhat in front of the middle line of its under side and somewhat below the middle line of its outer side, and in order to attach the yoke-strap to the yoke when the strap is attached to the animal's breast, the outer end of which strap forms a loop, said loop is passed over the end of the yoke-bar and pressed against the dog or catch 9, which readily yields, passing back between arm 5 and base 1, when spring 12 forces the dog or catch back to its normal position against lug 6, when the strap is secure, and thus prevents all possibility of the strap becoming accidentally detached from the clip. In order to detach the yoke-strap from the clip, the outer end of the dog is pressed away from the lug 6 of arm 5, as before, and the bend of the strap is drawn out from between the arm and the base 1.

From the above description it will be seen that the device is very simple, strong, and durable, and also inexpensive in construction, and that by its use the yoke-strap can be readily connected to and disconnected from the yoke-bar. It will also be seen that the dog 9 prevents any possibility of the yoke-strap being accidentally detached from the clip.

Having thus described my invention, what I claim as new therein, and desire to secure by Letters Patent, is—

An improved clip for yoke-bar straps, comprising a base having an integral L-shaped bar provided at its outer end with an upwardly-extending lug and extending longitudinally of the base, a longitudinal slot formed in the base above the outer end of the arm and two ears formed on the base at opposite sides of the slot, a spring secured to the base and working in the slot, and a dog having an enlarged flattened end pivoted between the ears and having projections at its outer end extending laterally beyond the end of the arm, said spring serving to retain the free end of the dog in contact with the lug at outer end of the arm, substantially as set forth.

In testimony whereof I affix my signature in presence of two witnesses.

JOHN T. HAMILTON.

Witnesses:
JOHN E. WEBER,
SAMUEL L. PATTON.